United States Patent
Beauchesne-Martel et al.

(10) Patent No.: US 12,031,489 B2
(45) Date of Patent: Jul. 9, 2024

(54) SYSTEM AND METHOD FOR VARIABLE GEOMETRY MECHANISM CONFIGURATION

(71) Applicant: PRATT & WHITNEY CANADA CORP., Longueuil (CA)

(72) Inventors: Philippe Beauchesne-Martel, Brossard (CA); Martin Drolet, Saint-Amable (CA); Axel Robert, Montreal (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 267 days.

(21) Appl. No.: 17/382,922

(22) Filed: Jul. 22, 2021

(65) Prior Publication Data
US 2023/0026702 A1 Jan. 26, 2023

(51) Int. Cl.
*F02C 9/22* (2006.01)
*F04D 27/00* (2006.01)

(52) U.S. Cl.
CPC .............. *F02C 9/22* (2013.01); *F04D 27/001* (2013.01); *F05D 2220/323* (2013.01); *F05D 2260/81* (2013.01); *F05D 2270/301* (2013.01); *F05D 2270/304* (2013.01); *F05D 2270/306* (2013.01); *F05D 2270/71* (2013.01)

(58) Field of Classification Search
CPC ........... F01D 17/16; F04D 27/001; F02C 9/20
See application file for complete search history.

(56) References Cited

U.S. PATENT DOCUMENTS

| 8,311,684 B2 | 11/2012 | Riverin | |
| 8,740,548 B2 * | 6/2014 | Rowe | F04D 29/563 415/48 |
| 2010/0152918 A1 * | 6/2010 | Riverin | F04D 27/001 700/301 |
| 2014/0093350 A1 * | 4/2014 | Meisner | F01D 17/08 415/17 |
| 2017/0114725 A1 * | 4/2017 | Holt | F01D 25/24 |
| 2017/0218854 A1 * | 8/2017 | Nestico | F02C 9/18 |
| 2020/0284204 A1 * | 9/2020 | Cafaro | G05B 13/0205 |

OTHER PUBLICATIONS

Airworthiness Directives Rolls-Royce plc Turbofan Engines, https://www.govinfo.gov/content/pkg/FR-2018-09-05/pdf/2018-19119.pdf.
Three-spool turbofan pass-off test data analysis using an optimization-based diagnostic technique, https://journals.sagepub.com/doi/full/10.1177/09576509211002311.

* cited by examiner

*Primary Examiner* — Woody A Lee, Jr.
*Assistant Examiner* — Cameron A Corday
(74) *Attorney, Agent, or Firm* — NORTON ROSE FULBRIGHT CANADA LLP

(57) ABSTRACT

A system and a method for configuring at least one variable geometry mechanism (VGM) of an aircraft engine are provided. Pass-off testing data for the aircraft engine is obtained, the pass-off testing data indicative of an actual value of at least one operating parameter of the aircraft engine. Based on the pass-off testing data, at least one trim value to be used to adjust a setting of the at least one VGM to bring the actual value of the at least one operating parameter towards a target value is determined, a running line of the aircraft engine being substantially constant when the actual value of the at least one operating parameter is at the target value. The setting of the at least one VGM is adjusted, during pass-off testing of the aircraft engine, using the at least one trim value.

8 Claims, 8 Drawing Sheets

SYSTEM AND METHOD FOR VARIABLE GEOMETRY MECHANISM CONFIGURATION

TECHNICAL FIELD

The application relates generally to controlling the operation of engines, and more particularly to determining variable geometry mechanism (VGM) schedules.

BACKGROUND OF THE ART

Gas turbine engines for use in aircraft typically comprise a variable geometry mechanism (VGM), such as inlet guide vanes (IGVs), whose variable positioning may be controlled according to a schedule to optimize compressor efficiency and minimize engine fuel burn. Known systems typically provide a common schedule amongst all engines, which limits engine operability and performance.

There is therefore a need for an improved system and method for variable geometry mechanism configuration.

SUMMARY

In one aspect, there is provided a method for configuring at least one variable geometry mechanism (VGM) of an aircraft engine. The method comprises obtaining pass-off testing data for the aircraft engine, the pass-off testing data indicative of an actual value of at least one operating parameter of the aircraft engine, determining, based on the pass-off testing data, at least one trim value to be used to adjust a setting of the at least one VGM to bring the actual value of the at least one operating parameter towards a target value, a running line of the aircraft engine being substantially constant when the actual value of the at least one operating parameter is at the target value, and adjusting, during pass-off testing of the aircraft engine, the setting of the at least one VGM using the at least one trim value.

In another aspect, there is provided a system for configuring at least one variable geometry mechanism (VGM) of an aircraft engine. The system comprises at least one processing unit and a non-transitory computer readable medium having stored thereon program code executable by the at least one processing unit for obtaining pass-off testing data for the aircraft engine, the pass-off testing data indicative of an actual value of at least one operating parameter of the aircraft engine, determining, based on the pass-off testing data, at least one trim value to be used to adjust a setting of the at least one VGM to bring the actual value of the at least one operating parameter towards a target value, a running line of the aircraft engine being substantially constant when the actual value of the at least one operating parameter is at the target value, and adjusting, during pass-off testing of the aircraft engine, the setting of the at least one VGM using the at least one trim value.

DESCRIPTION OF THE DRAWINGS

Reference is now made to the accompanying figures in which.

It will be noted that throughout the appended drawings, like features are identified by like reference numerals.

DETAILED DESCRIPTION

Figure 1:
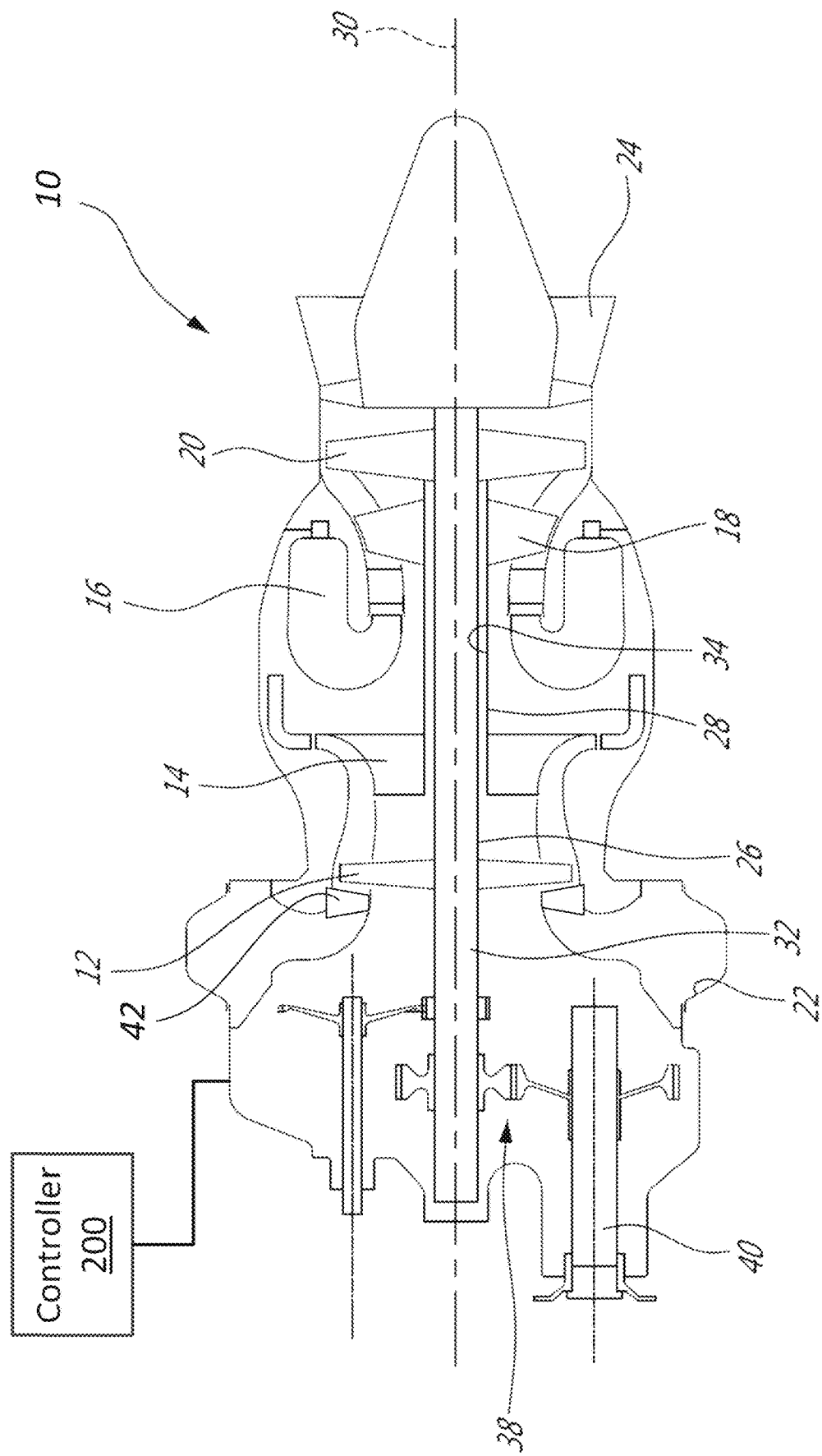
FIG. 1 is a schematic cross-sectional view of a gas turbine engine, in accordance with an illustrative embodiment.

FIG. 1 illustrates a gas turbine engine 10 of a type preferably provided for use in subsonic flight, generally comprising in serial flow communication a low pressure (LP) compressor section 12 and a high pressure (HP) compressor section 14 for pressurizing air, a combustor 16 in which the compressed air is mixed with fuel and ignited for generating an annular stream of hot combustion gases, a high pressure turbine section 18 for extracting energy from the combustion gases and driving the high pressure compressor section 14, and a lower pressure turbine section 20 for further extracting energy from the combustion gases and driving at least the low pressure compressor section 12.

The low pressure compressor section 12 may rotate independently from the high pressure compressor section 14. The low pressure compressor section 12 may include one or more compression stages and the high pressure compressor section 14 may include one or more compression stages. A compression stage may include a compressor rotor, or a combination of the compressor rotor and a compressor stator assembly. In a multistage compressor configuration, the compressor stator assemblies may direct the air from one compressor rotor to the next.

The engine 10 has multiple, i.e. two or more, spools which may perform the compression to pressurize the air received through an air inlet 22, and which extract energy from the combustion gases before they exit via an exhaust outlet 24. In the illustrated embodiment, the engine 10 includes a low pressure spool 26 and a high pressure spool 28 mounted for rotation about an engine axis 30. The low pressure and high pressure spools 26, 28 are independently rotatable relative to each other about the axis 30. The term "spool" is herein intended to broadly refer to drivingly connected turbine and compressor rotors.

The low pressure spool 26 includes a low pressure shaft 32 interconnecting the low pressure turbine section 20 with the low pressure compressor section 12 to drive rotors of the low pressure compressor section 12. In other words, the low pressure compressor section 12 may include at least one low pressure compressor rotor directly drivingly engaged to the low pressure shaft 32 and the low pressure turbine section 20 may include at least one low pressure turbine rotor directly drivingly engaged to the low pressure shaft 32 so as to rotate the low pressure compressor section 12 at a speed proportional to the low pressure turbine section 20 speed. The high pressure spool 28 includes a high pressure shaft 34 interconnecting the high pressure turbine section 18 with the high pressure compressor section 14 to drive rotors of the high pressure compressor section 14. In other words, the high pressure compressor section 14 may include at least one high pressure compressor rotor directly drivingly engaged to the high pressure shaft 34 and the high pressure turbine section 18 may include at least one high pressure turbine rotor directly drivingly engaged to the high pressure shaft 34 so as to rotate the high pressure compressor section 14 at a same speed as the high pressure turbine section 18. In some embodiments, the high pressure shaft 34 may be hollow and the low pressure shaft 32 extends therethrough. The two shafts 32, 34 are free to rotate independently from one another.

The engine 10 may include a transmission 38 driven by the low pressure shaft 32 and driving a rotatable output shaft 40. The transmission 38 may vary a ratio between rotational speeds of the low pressure shaft 32 and the output shaft 40.

The engine 10 comprises one or more variable geometry mechanism (VGM), such as inlet guide vanes (IGVs) 42 moveable for directing air into the compressor section 12 (e.g. compressor inlet guide vanes). For example, the IGVs 42 may comprise low-pressure compressor inlet guide vanes, mid-pressure compressor inlet guide vanes, and/or high-pressure compressor inlet guide vanes. It should however be understood that the VGM may in some embodiments consist of outlet guide vanes for directing air out of the compressor section 12, variable stator vanes for directing incoming air into rotor blades of the engine 10, variable nozzles, handling bleed valves, and the like.

As described hereinabove, control of the operation of the engine 10 can be effected by one or more control system, for example the controller 200. The controller 200 can modulate a fuel flow ($W_1$) provided to the engine 10, the position and/or orientation (also referred to as a "setting") of the VGMs within the engine 10, a bleed level of the engine 10, and the like. In some embodiments, the controller 200 may be configured for controlling operation of multiple engines. For example, the controller 200 can be provided with one or FADECs or similar devices. Each FADEC can be assigned to control the operation of one or more engine as in 10. Additionally, in some embodiments the controller 200 can be configured for controlling operation of other elements of an aircraft (not shown) in which the engine 10 is operated, for instance the aircraft's main rotor (not shown).

Although illustrated as a turboshaft engine, the gas turbine engine 10 may alternatively be another type of engine, for example a turbofan engine, also generally comprising in serial flow communication a compressor section, a combustor, and a turbine section, and a fan through which ambient air is propelled. A turboprop engine may also apply. The engine 10 may also be an auxiliary power unit (APU), an auxiliary power supply), a hybrid engine, or any other suitable type of engine. In addition, although the engine 10 is described herein for flight applications, it should be understood that other uses, such as industrial or the like, may apply.

Figure 2:
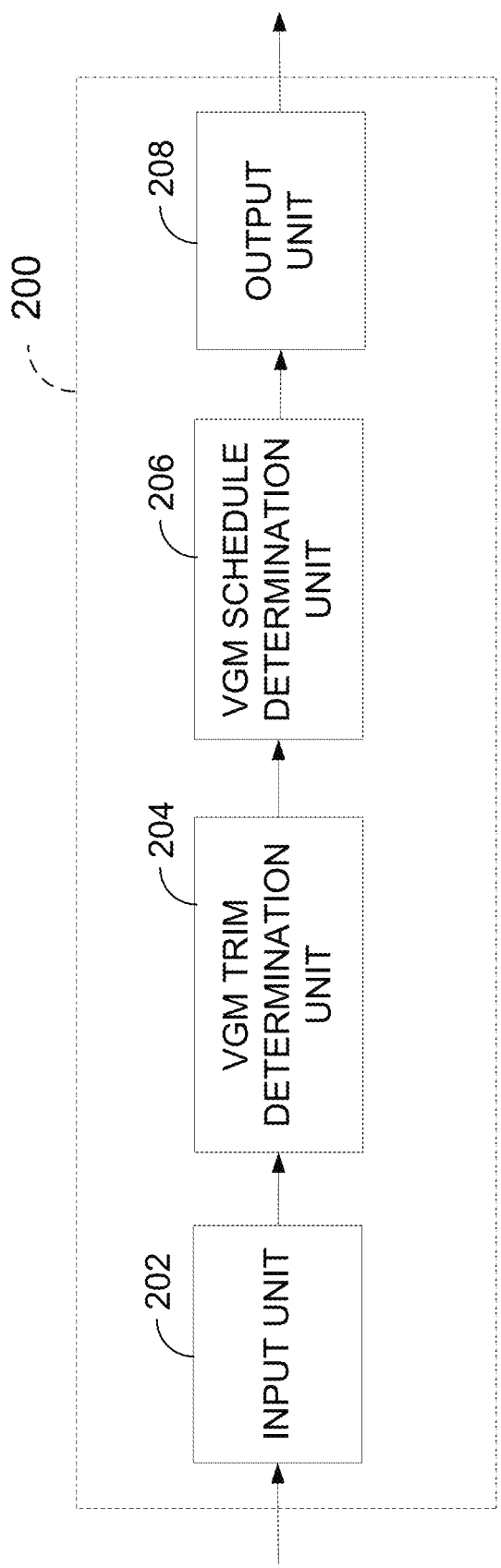
FIG. 2 is a block diagram of the controller of FIG. 1, in accordance with an illustrative embodiment.

With reference to FIG. 2, the controller 200 comprises an input unit 202, a VGM trim determination unit 204, a VGM schedule determination unit 206, and an output unit 208. It will be understood that the embodiment of FIG. 2 is merely one example of a configuration for the controller 200.

As will be described further below, the controller 200 is configured to configure the VGMs during pass-off testing by adjusting the settings (i.e. the position and/or orientation) of the VGMs based on a trimmed VGM schedule, in order to account for engine-to-engine variations in Surge Margin Audit (SMA) requirements to be met during pass-off testing. As used herein, the expressions "trimmed", "trimming, and "trim" refer to an adjustment or bias applied to a nominal or original value. As will also be described further below, in order to target a substantially constant running line for the engine 10, one or more trim values are determined by the controller 200 and applied to nominal VGM schedule(s) to obtain trimmed VGM schedule(s) which are used to adjust the settings of the VGMs of the engine 10. As used herein, the expression "running line" (also referred to as a "working line" or an "operating line") refers to a typical steady state operating line of the engine 10 and provides an indication of a locus (e.g., on a compressor map of the engine 10) of operating points of the engine 10 as it is throttled. Therefore, when a substantially constant running line is achieved for the engine 10, the engine's operating points have a substantially equal value (e.g., within a predetermined tolerance) on a given axis (e.g., x-axis or y-axis) of the compressor map. In other words, the engine's operating points would be substantially positioned along a line (horizontal or vertical) on the compressor map.

The controller 200 determines the trim value(s) during a production phase, and more particularly during pass-off testing, of each engine 10 independently. As used herein, the expression "pass-off testing", also referred to as production (or repair/overhaul) pass-off testing or acceptance testing, refers to a phase during which an engine is tested (typically in a limited range of operating conditions vs. the full engine operating envelope) to ensure that the engine meets key acceptance criteria. The pass-off testing phase is the final check on component manufacture and engine build quality upon engine assembly completion in production (or following repair and overhaul) and prior to shipment to a customer.

The determined trim value(s) are specific to each engine 10 (i.e. associated with the engine's serial number) and vary from engine to engine. In one embodiment, the engine 10 is operated under a test environment (e.g., in a production test cell provided at a testing facility) to obtain the trim value(s) for that engine 10. Simulation and/or modeling of the engine 10 may also be used (e.g., through the controller 200) during the pass-off testing phase to obtain the trim value(s). The trim value(s) are determined to optimize one or more parameters (also referred to herein as operating parameters) of the engine 10. Various parameters may apply because the definition of the running line of engine 10 may vary (e.g., the running line may be defined as a function of flow versus pressure ratio, engine rotational speed versus pressure ratio, engine power versus pressure ratio, engine rotational speed versus engine power, or the like). In some embodiments, the parameter to be optimized includes, but is not limited to, a compressor surge margin, a compressor stall margin, a compressor flameout margin, or any other suitable engine parameter. The compressor "surge margin" is a measure of how close an operating point of the engine 10 is close to surge (i.e. a complete disruption of the airflow through the compressor). Similarly, the compressor "stall margin" is a measure of how close an operating point of the engine 10 is close to stall (i.e. a local disruption of the airflow in the engine's compressor) and the compressor "flameout margin" is a measure of how close an operating point of the engine 10 is close to flameout (i.e. run-down of the engine 10 due to the extinction of the flame in the combustion chamber). In some embodiments, the trim value(s) are set to concurrently optimize a plurality of parameters, such as fuel flow and pressure ratio (computed by dividing the engine's absolute outlet pressure by the engine's absolute inlet pressure), or stall margin and Turbine Inlet Temperature (TIT). Optimization of three or more parameters may also be performed. The VGM schedule is then trimmed based on the trim value(s) during the pass-off testing phase of the engine 10, prior to shipment of the engine 10 to the customer.

The input unit 202 receives pass-off testing data for the engine 10. The pass-off testing data may be obtained from a test cell system and/or retrieved from suitable storage (e.g., a memory or database) communicatively coupled to the controller 200, with pass-off testing being performed on a specific engine serial number with nominal VGM schedules. The pass-off testing data is therefore indicative of an actual value of the one or more operating parameters that are being optimized for the engine 10. In one embodiment, the pass-off testing data is indicative of actual value(s) of an operability parameter of the engine 10 and actual value(s) of a performance parameter of the engine 10. For example, the performance parameter may include, but is not limited to, specific fuel consumption (SFC), turbine inlet temperature, and rotational speed of the engine, and the operability parameter may include, but is not limited to, surge margin, pressure ratio, and acceleration time of the engine 10. As used herein, the term "specific fuel consumption" or SFC refers to the fuel efficiency of the engine 10 with respect to power output, i.e. the mass of fuel needed to provide a given output shaft power from the engine 10 for a given period.

The VGM trim determination unit 204 then determines, based on the pass-off testing data, at least one trim value to be used to adjust the settings of the VGMs such that the actual value of the at least one operating parameter is brought towards a target value and a substantially constant running line is achieved for the engine 10. In some embodiments, the VGM trim determination unit 204 is configured to determine the at least one trim value and reassess and adjust the at least one trim value throughout the entire life of the engine 10, in order to cater for engine deterioration. For example, the at least one trim value (and/or the scaling factor described further below) determined during pass-off testing of the engine 10 could be reassessed based on engine trend monitoring in the field.

The VGM trim determination unit 204 determines the at least one trim value by first obtaining (e.g., from any suitable storage means such as a database or memory) a virtual engine model that is able to simulate the behaviour of the engine 10 based on the engine's design, operating conditions, and limitations. The VGM trim determination unit 204 runs the engine model at a target engine operating parameter, such as a target compressor mass flow and pressure ratio. In some embodiments, the engine model is first aligned to match the pass-off testing data of the specific engine serial number, as obtained from the input unit 202. The VGM trim determination unit 204 may then run the aligned model at the target compressor mass flow and the VGM settings of the engine 10 may be adjusted to reach the target pressure ratio. It should be understood that the VGM settings may be adjusted to reach any other suitable parameter, such as a target surge margin for instance. The VGM setting (referred to herein as a "first VGM setting") that allows to reach the target pressure ratio (or surge margin) at a given compressor mass flow may then be recorded (e.g., stored in memory). The resulting shaft horse power SHP (or corrected compressor rotor speed Ncorr, depending on the operating parameter being targeted) may also be recorded. In some embodiments, the VGM trim determination unit 204 may subsequently run the aligned model at the recorded shaft horse power (or corrected compressor rotor speed), using the nominal VGM schedule and the resulting VGM setting (referred to herein as a "second VGM setting") may then be recorded. The at least one trim value may then be computed by the VGM trim determination unit 204 by subtracting the first VGM setting from the second VGM setting. The at least one trim value may then be recorded by the controller 200.

The pass-off testing calibration is then repeated for the engine 10, where engine pass-off calibration is performed anew for the engine 10 using the at least one trim value computed by the VGM trim determination unit 204. New pass-off testing data is then received at the VGM trim determination unit 204 upon completion of this second pass-off testing phase. The VGM trim determination unit 204 then proceed to verify that the engine 10 is still within pass-off limits or requirements (also referred to herein as "production acceptance limits" or criteria). The production acceptance limits define an acceptance range (i.e. minimum and maximum values) for the engine operating parameters (e.g. fuel consumption, turbine temperature, rotational speed of the engine) that cannot be exceeded. The VGM trim determination unit 204 compares the new pass-off testing data (i.e. the actual values of the engine operating parameters) to the production acceptance limits. When it is determined that the new pass-off testing data exceeds the production acceptance limits, the VGM trim determination unit 204 adjusts the previously determined trim value in order to bring the engine operating parameters within the production acceptance limits, thus optimizing the trim value. This adjustment process is repeated until it is determined that the new pass-off testing data is within production acceptance limits, in which case the VGM schedule trimming procedure is completed.

Once the trimming procedure is complete, the at least one trim value is then sent from the VGM trim determination unit 204 to the VGM schedule determination unit 206, which applies the at least one trim value to one or more nominal VGM schedules of the engine 10 to obtain one or more trimmed VGM schedules. As will be described herein below, in some embodiments, the VGM schedule determination unit 206 applies the at least one trim value to the nominal VGM schedule(s) directly (e.g., linearly as a constant value). In other embodiments, the VGM schedule determination unit 206 determines a scaling factor to be applied to the at least one trim value in order to take account for additional parameters (i.e. in addition to the optimized engine operating parameter(s)) not quantified during engine pass-off. The additional parameters may include, but are not limited to, altitude, ambient pressure, ambient temperature, engine speed, engine power, and air pressure measured at the exit of at least one compression stage of the engine 10. The scaled trim value(s) are then applied to the nominal VGM schedule (s) to obtain the trimmed VGM schedule.

The need for scaling the at least one trim value (and the manner in which the scaling factor is determined) may depend on the engine's sensitivity to a plurality of factors and effects (e.g., altitude), as well as on the VGM control schedule. For example, a VGM schedule that is already catering for altitude effects may need little to no scaling (versus altitude), compared to a VGM schedule that does not take altitude effects into consideration (i.e. does not perform any correction to cater for altitude effects). In addition, in some embodiments, the additional parameters may include other VGM schedules. For instance, the trim value(s) associated with a given VGM schedule (e.g., $VGM_1$) may be adjusted as a function of another VGM schedule (e.g., $VGM_2$), which may or may not be a trimmed schedule. For example, for VGM comprising a set of variable inlet guide vanes (VIGVs) and a Handling Bleed-off Valve (HBOV), the trim value(s) of the VIGVs may be scaled as a function of the HBOV schedule.

As mentioned herein above, the engine 10 may have one or more compression stages operatively coupled to VGMs, a setting of which is determined based on a VGM schedule. In some embodiments, the VGM schedule determination unit 206 applies the at least one trim value to trim the VGM schedule associated with a single compression stage of the engine 10. In other embodiments, the VGM schedule determination unit 206 applies the at least one trim value to trim the VGM schedules associated with multiple compression stages of the engine 10. In one embodiment, the VGM schedule determination unit 206 linearly applies (i.e. as a constant value) the at least one trim value to the nominal VGM schedule of one compression stage (e.g., the low pressure compressor section 12) and leaves the nominal VGM schedules of the remaining compression stages (e.g., the high pressure compressor section 14) untrimmed. In another embodiment, the VGM schedule determination unit 206 linearly applies the at least one trim value to the nominal VGM schedule of one compression stage (e.g., the low pressure compressor section 12) and applies scaled trim value(s) to the VGM schedules of remaining compression stages (e.g., the high pressure compressor section 14). Other embodiments may apply.

The one or more trimmed VGM schedules are then sent by the VGM schedule determination unit 206 to the output unit 208 for the VGM settings to be adjusted. In one embodiment, the output unit 208 generates one or more control signals based on the trimmed VGM schedule(s) to adjust the settings of the VGMs for configuring the VGMs during pass-off. The one or more control signals may be sent to an actuator system (e.g., one or more hydraulic or electric actuators or any other suitable actuating means) operatively coupled to the VGMs and configured to control a position and/or orientation of the VGMs.

Figure 3:
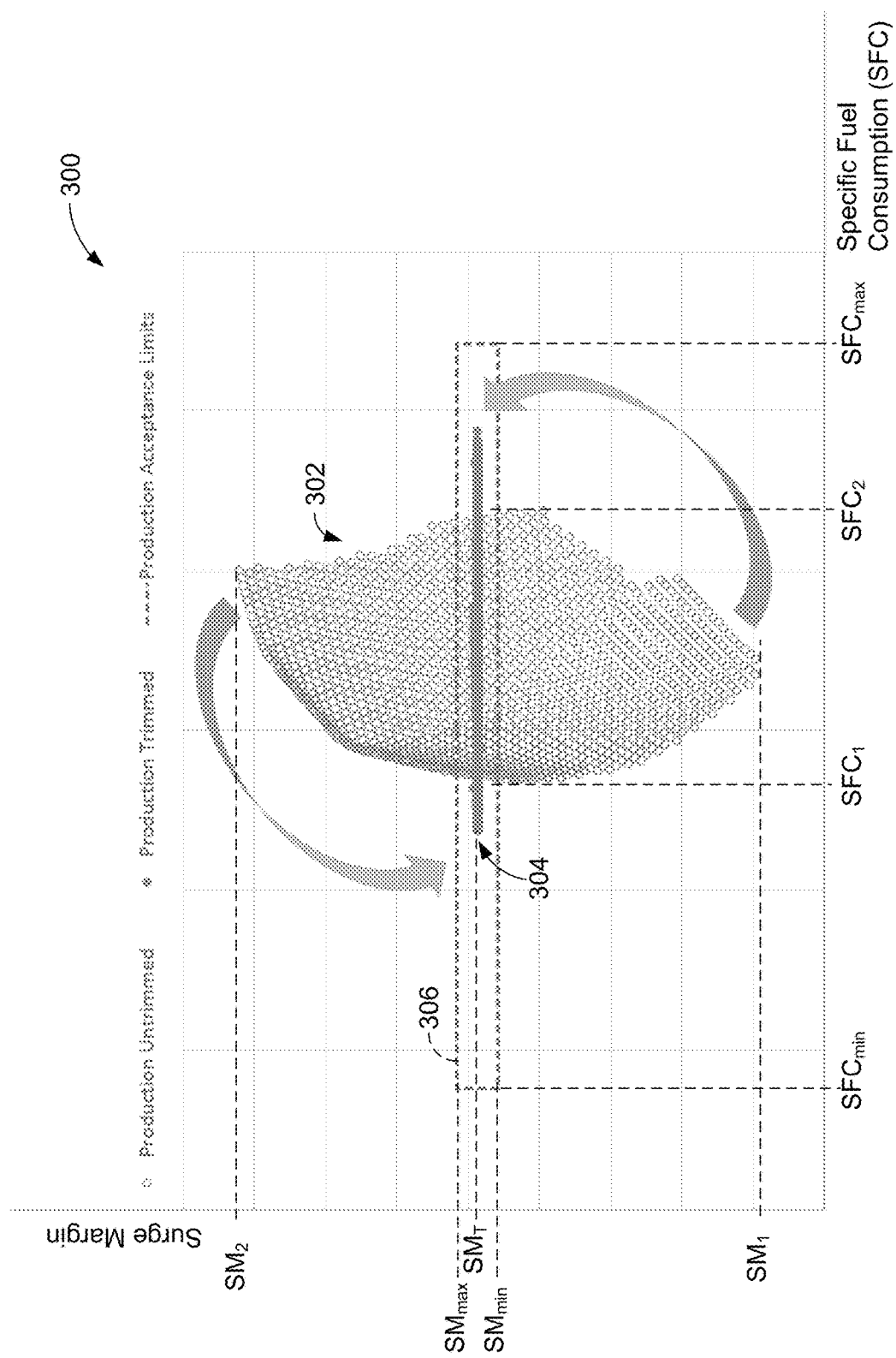
FIG. 3 is a graphical illustration of operability and performance characteristics of an engine before and after trimming, in accordance with an illustrative embodiment.

FIG. 3 illustrates the results of applying the systems and methods described herein to an engine, such as the engine 10 of FIG. 1. FIG. 3 is a graphical illustration of operability and performance characteristics of an engine, such as engine 10, before and after trimming, in accordance with an illustrative embodiment. More specifically, FIG. 3 shows a chart 300 of a performance parameter (horizontal or x-axis) versus an operability parameter (vertical or y-axis) of the engine 10. In one embodiment, the performance parameter of the engine 10 is SFC and the operability parameter of the engine 10 is surge margin. As can be seen in FIG. 3, when the engine's VGM schedule is untrimmed (i.e. the engine 10 is operated according to the nominal VGM schedule), the values (or operating points) 302 for surge margin as a function of SFC are scattered throughout the chart 300, with the surge margin values ranging between $SM_1$ and $SM_2$ for SFC values ranging between $SFC_1$ and $SFC_2$. In contrast, when the engine's VGM schedule is trimmed using the system and methods described herein, the operating points 304 for surge margin as a function of SFC remain (within a predetermined tolerance) at a substantially constant value labelled $SM_T$ in FIG. 3 (also referred to herein as a target surge margin value). The operating points 304 also remain within predetermined production acceptance limits (i.e. requirements or criteria) illustrated by box 306 in FIG. 3, unlike some of the operating points 302 which exceeded the production acceptance limits. In other words, applying the trim value to the nominal VGM schedule shifts the operating points of the engine 10 to target a balanced (i.e. substantially constant) running line in terms of operability versus performance, within production acceptance limits.

As described above, in one embodiment, the production acceptance limits define an acceptance range (i.e. minimum and maximum values) for the engine operating parameters (i.e. performance and operability parameters) that cannot be exceeded. In other words, in the embodiment of FIG. 3, the production acceptance limits (illustrated by box 306) include a minimum surge margin value $SM_{min}$ below which the engine's surge margin cannot be decreased and a maximum surge margin value $SM_{max}$ above which the engine's surge margin cannot be increased. In the embodiment of FIG. 3, The production acceptance limits also include a minimum SFC value $SFC_{min}$ below which the engine's SFC cannot be decreased and a maximum SFC value $SFC_{max}$ above which the engine's SFC cannot be increased. As can be seen in FIG. 3, for any SFC value, the target surge margin value $SM_T$ achieved by trimming the VGM schedule of the engine 10 using the systems and methods described herein remains within the production acceptance range, i.e. above the minimum surge margin value $SM_{min}$ and below the maximum surge margin value $SM_{max}$.

Figure 4:
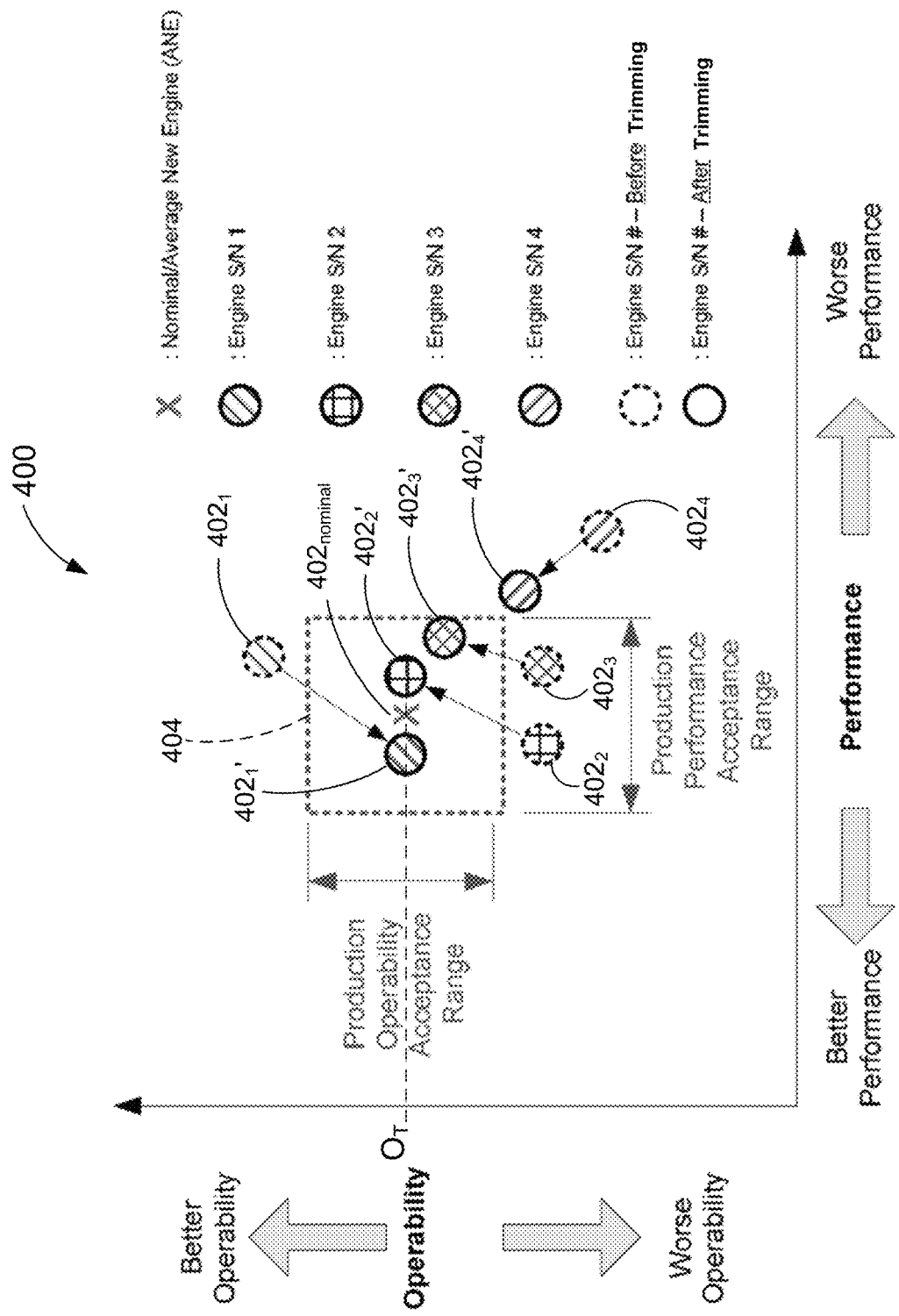
FIG. 4 is a graphical illustration of operability and performance characteristics of a plurality of engines before and after trimming, in accordance with an illustrative embodiment.

Turning now to FIG. 4, there is illustrated an example of applying the systems and methods described herein to multiple engines each having a unique serial number associated therewith. FIG. 4 is a graphical illustration of operability and performance characteristics of a plurality of engines before and after trimming, in accordance with an illustrative embodiment. FIG. 4 shows a chart 400 of a performance parameter (horizontal or x-axis) versus an operability parameter (vertical or y-axis) for four (4) engines each having a respective serial number (S/N) associated therewith, the serial numbers being labelled from 1 to 4 in FIG. 3 for sake of clarity. While the chart 400 is shown with respect to four (4) engines, it should be understood that any suitable number of engines may apply. The initial (i.e. before trimming is applied) operating points of the engines are labelled $402_1$, $402_2$, $402_3$, and $402_4$ and the trimmed operating points are labelled as $402_1'$, $402_2'$, $402_3'$, and $402_4'$. The initial operating points $402_1$, $402_2$, $402_3$, and $402_4$ are determined based on the pass-off testing data obtained from each engine and are indicative of the actual values of each engine's operating parameters (i.e. performance and operability parameters). From FIG. 3, it can be seen that all initial operating points $402_1$, $402_2$, $402_3$, and $402_4$ are outside of the predetermined production acceptance range defined by box 404 (i.e. fail to meet the production acceptance limits). As described herein above, the VGM schedule of each engine is trimmed in order to bring the actual values of each engine's operating parameters towards target operability and performance values associated with a nominal engine (also referred to as an "average new engine" ANE), while meeting the predetermined production acceptance limits. In other words, the VGM schedules are trimmed to bring the operating points $402_1$, $402_2$, $402_3$, and $402_4$ towards a target operating point labeled as in $402_{nominal}$ FIG. 3. The target values of the operating parameters (i.e. the target operating point $402_{nominal}$) may be determined during engine design and may vary depending on engine configuration.

In one embodiment, the VGM schedule of each engine is trimmed by targeting a given value $O_T$ for an engine operability parameter, in order to achieve a substantially constant running line. In one embodiment, the operability parameter is surge margin. It should however be understood that the definition of the running line may vary, as described herein above, and the VGM schedule may therefore be trimmed by targeting a given value for any other suitable operability parameter or by targeting a given value of an engine performance parameter.

Turning to the first engine, which has serial number 1 and an initial operating point $402_1$ (determined from the pass-off testing date for the first engine), it can be seen that the operability of the first engine is above (i.e. better than) that of the nominal engine while the performance of the first engine is lower (i.e. worse) than that of the nominal engine. The trim value is then determined to bring the initial operating point $402_1$ towards the target operating point $402_{nominal}$ while meeting the production acceptance criteria. More specifically, adjusting the setting of the first engine's VGM using the trimmed VGM schedule results in the initial operating point $402_1$ being shifted to a trimmed operating point $402_1'$, where the target operability (e.g., surge margin) value $O_T$ associated with the target operating point $402_{nominal}$ is achieved. It can be seen that, with the initial operating point $402_1$ shifted to the trimmed operating point $402_1'$, the operability of the first engine is lowered (yet achieves the target value $O_T$) while the performance of the first engine is improved.

Turning to the second engine, which has serial number 2 and an initial operating point $402_2$, it can be seen that the operability of the second engine is lower (i.e. worse) than that of the nominal engine while the performance of the first engine is above (i.e. better than) that of the nominal engine. The trim value is then determined to bring the initial operating point $402_2$ towards the target operating point $402_{nominal}$ while meeting the production acceptance criteria. More specifically, adjusting the setting of the second engine's VGM using the trimmed VGM schedule results in the initial operating point $402_2$ being shifted to a trimmed operating point $402_2'$, where the target operability value $O_T$ is achieved. It can be seen that, with the initial operating point $402_2$ shifted to the trimmed operating point $402_2'$, the operability of the second engine is improved while the performance of the second engine is lowered (yet remains within the production acceptance range 404).

Turning to the third engine, which has serial number 3 and an initial operating point $402_3$, it can be seen that both the operability and the performance of the third engine are lower (i.e. worse) than that of the nominal engine. The trim value is then determined to bring the initial operating point $402_3$ towards the target operating point $402_{nominal}$ while meeting the production acceptance criteria. More specifically, adjusting the setting of the third engine's VGM using the trimmed VGM schedule results in the initial operating point $402_3$ being shifted to a trimmed operating point $402_3'$. It can be seen that, at the trimmed operating point $402_3'$, the target operability value $O_T$ associated is not achieved because this would result in the performance of the third engine failing to meet the production acceptance criteria (i.e. exceeding the minimum performance limit and in an operating point being positioned outside of the production acceptance range defined by box 404). In other words, the minimum production performance acceptance limit is reached before achieving the nominal operability target $O_T$ and the maximum possible trim is reached at operating point $402_3'$. It can be seen that, with the initial operating point $402_3$ shifted to the trimmed operating point $402_3'$, the third engine's operability is improved (although not achieving the target value $O_T$) while its performance is worsened (yet remains within the production acceptance range 404).

Turning now to the fourth engine, which has serial number 4 and an initial operating point $402_4$, it can be seen that both the operability and the performance of the fourth engine are lower (i.e. worse) than that of the nominal engine. In fact, the fourth engine's operability and performance are so far from the target values associated with operating point $402_{nominal}$ and from the production acceptance range 404 that the use of the systems and methods described herein cannot suffice to bring the operating parameters of the fourth engine within the production acceptance range 404. Indeed, when the trimmed schedule is used to adjust the setting of the VGMs of the fourth engine, the trimmed operating point $402_4'$ remains outside of the production acceptance range 404. This may be indicative of a significant defect in the fourth engine. It may therefore be desirable to abort the trimming procedure for the fourth engine (e.g., in order to avoid overcompensating for overly deviated engine hardware and components) and prevent the fourth engine from being shipped to the customer. For example, the controller 200 may output instructions to cause the fourth engine to be disassembled and re-matched (i.e. have the VGM changed) prior to shipment. The controller 200 may therefore include logic to abort (and/or limit the range of) the VGM schedule trimming procedure for engines whose operating parameters remain, after trimming, beyond a predetermined threshold (e.g. for which the distance between the engines' operating points and the nominal operating point on the compressor map exceeds a predetermined threshold distance), which is indicative of a defect of the engine. In other words, for such engines, the controller 200 may also cause the process of determining trim value(s) (as implemented by the VGM trim determination unit 204 of FIG. 2) and determining trimmed VGM schedule(s) (as implemented by the VGM schedule determination unit 206 of FIG. 2) to be aborted. Alternatively or additionally, the controller 200 may cause the trim value(s) determined by the VGM trim determination unit 204 to be limited to a predetermined value (e.g., ±5 to 10 degrees), depending on engine size, design, configuration, and the like. This may in turn avoid concealing potential engine discrepancies.

Figure 5:
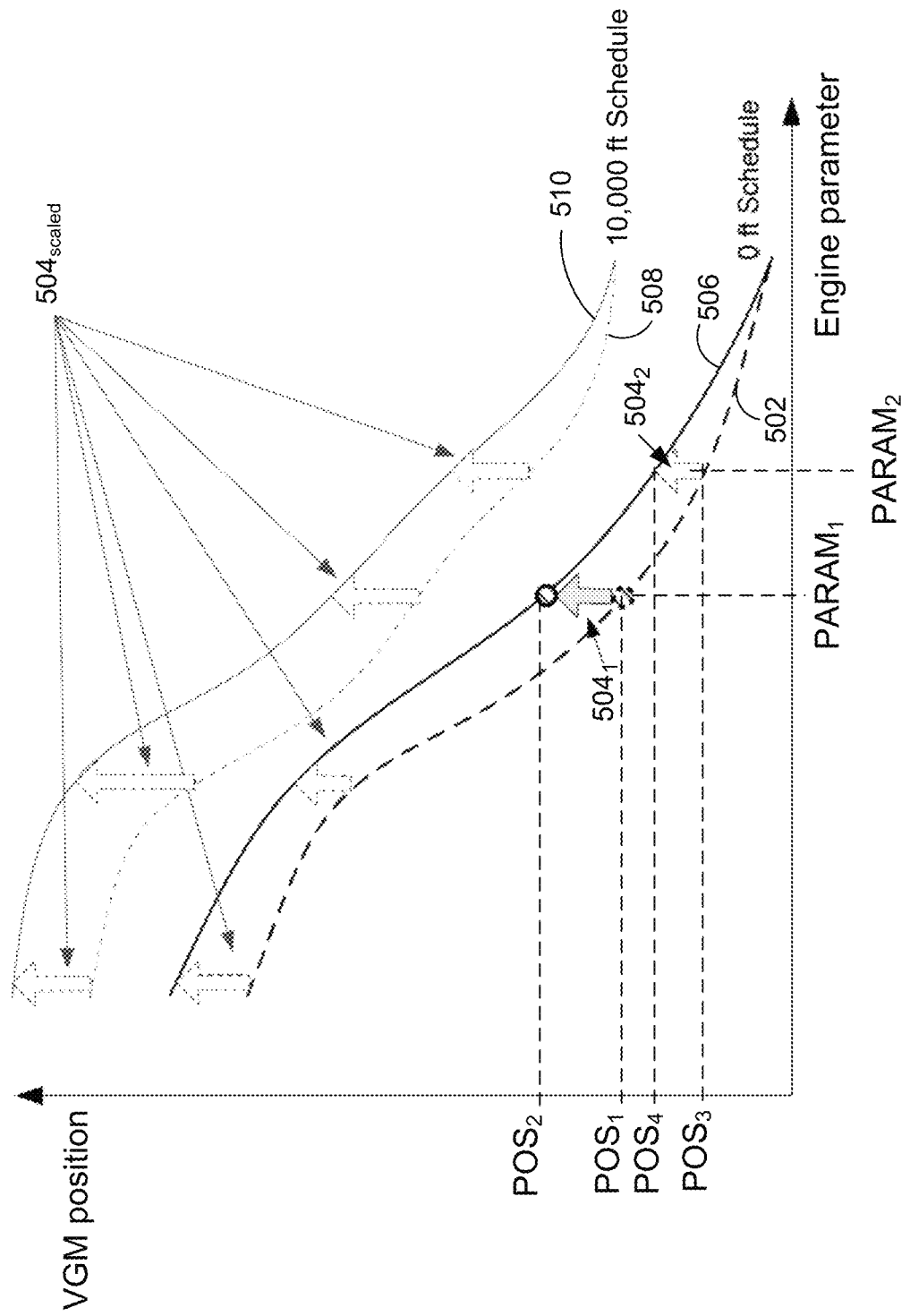
FIG. 5 is a graphical illustration of nominal and trimmed VGM schedules of an engine, in accordance with an illustrative embodiment.

Referring now to FIG. 5, there is illustrated an example of trimming applied to VGM schedules in accordance with one embodiment. FIG. 5 is a graphical illustration of nominal and trimmed VGM schedules of an engine, such as the engine 10. The VGM schedules illustrated in FIG. 5 represent the VGM position as a function of one or more parameters of the engine 10 and/or the aircraft. The parameters include the engine operating parameter(s) to be optimized as well as additional parameters (which relate to the performance of the aircraft and/or the operating environment of the aircraft) to be taking into account during VGM scheduling. The VGM schedules illustrated in FIG. 5 may therefore be a function of engine and/or aircraft parameters that include, but are not limited to, altitude, ambient pressure, ambient temperature, engine speed, engine output shaft power (i.e. output shaft torque and speed), corrected compressor rotor speed, and compressor delivery air pressure. It should be understood that the VGM schedules may also be a function of additional parameters (e.g., specific work, corrected mass flow). As previously noted, the VGM schedule trimming process is tailored to each engine and the trim value, which is determined during production (i.e. during pass-off testing) of a given engine, may be proportionally scaled as a function of one or more of the engine and aircraft parameters to determine a final trimmed VGM schedule. Scaling may be performed by the controller 200 as a function of a specific operating point in the envelope at a given point in time.

For example, curve 502 illustrates a first nominal VGM schedule (VGM position versus engine parameter) for the engine 10. Curve 502 may be used when the engine 10 is operating at zero (0) feet. The nominal position for the VGM is set to $POS_1$ for a value $PARAM_1$ of the engine parameter. At $POS_1$, the trim value $504_1$ is applied directly (e.g. linearly, as a constant value) to the nominal schedule 502.

Applying a trim value $504_1$ to the nominal schedule 502 shifts the VGM position vertically to curve 506, which corresponds to a trimmed VGM schedule. For a same value $PARAM_1$ of the engine parameter, the trimmed VGM position is $POS_2$. For other values (i.e. other than $PARAM_1$) of the engine parameter, the trim value $504_1$ is scaled to obtain one or more scaled trim values (labelled $504_{scaled}$) that are applied to the nominal VGM schedule to obtain the final trimmed VGM schedule 506. For example, for a value $PARAM_2$ of the engine parameter, the trim value $504_1$ is scaled to obtain a trim value $504_2$ and the trimmed VGM position is shifted from $POS_3$ to $POS_4$. Curve 508 of FIG. 5 illustrates a second nominal VGM schedule to be used when the engine 10 is operating at a different altitude (e.g., ten thousand (10,000) feet). It can be seen that, for different values of the engine parameter, scaled versions of the trim value $504_1$ (i.e. the scaled trim values $504_{scaled}$) are applied to the second nominal VGM schedule to obtain the final trimmed VGM schedule illustrated by curve 510. The value of the scaling factor that is applied to the trim value $504_1$ varies depending on engine configuration, as discussed herein above.

Figure 6:
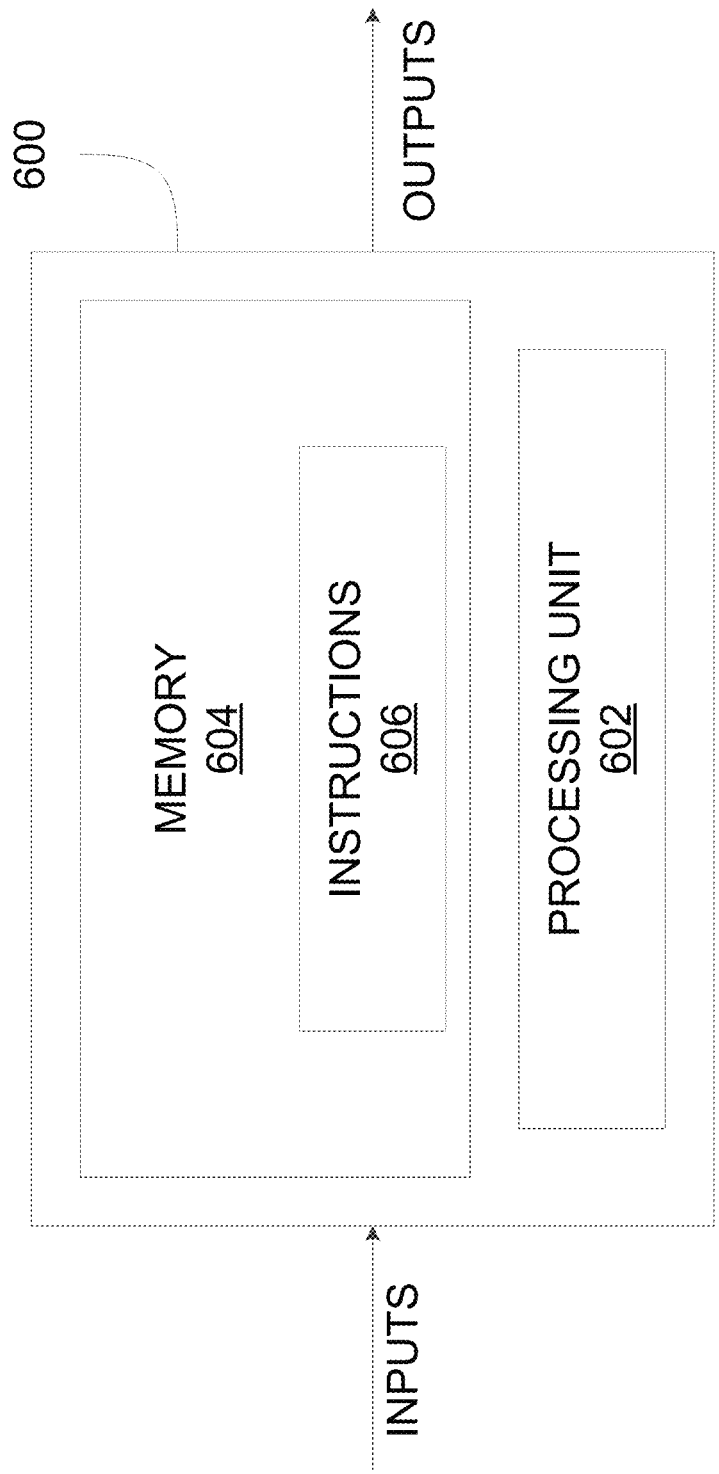
FIG. 6 is a block diagram of an example computing device, in accordance with an illustrative embodiment.

In some embodiments, the controller 200 is implemented in one or more computing devices 600, as illustrated in FIG. 6. For simplicity only one computing device 600 is shown but the system may include more computing devices 600 operable to exchange data. The computing devices 600 may be the same or different types of devices. The controller 200 may be implemented with one or more computing devices 600. Note that the controller 200 can be implemented as part of a full-authority digital engine controls (FADEC) or other similar device, including electronic engine control (EEC), engine control unit (ECU), electronic propeller control, propeller control unit, and the like. Other embodiments may also apply.

The computing device 600 comprises a processing unit 602 and a memory 604 which has stored therein computer-executable instructions 606. The processing unit 602 may comprise any suitable devices configured to implement the methods described herein such that instructions 606, when executed by the computing device 600 or other programmable apparatus, may cause the functions/acts/steps performed as part of the methods as described herein to be executed. The processing unit 602 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 604 may comprise any suitable known or other machine-readable storage medium. The memory 604 may comprise non-transitory computer readable storage medium, for example, but not limited to, an electronic, magnetic, optical, electromagnetic, infrared, or semiconductor system, apparatus, or device, or any suitable combination of the foregoing. The memory 604 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 604 may comprise any storage means (e.g., devices) suitable for retrievably storing machine-readable instructions 606 executable by processing unit 602.

Figure 7A:
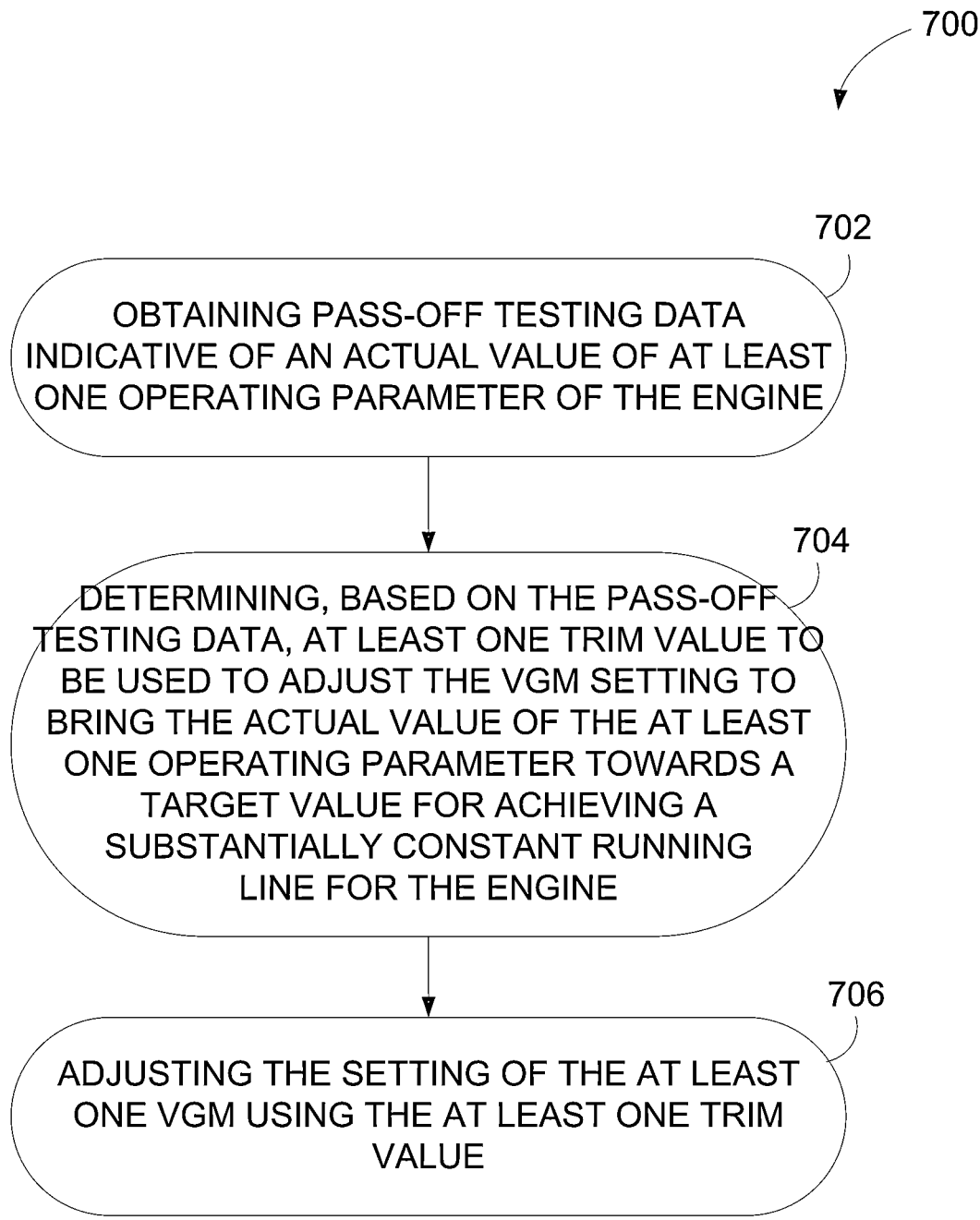
FIG. 7A is a flow diagram of a method for determining a VGM schedule, in accordance with an illustrative embodiment.

With reference to FIG. 7A, there is illustrated an example method 700 for determining a VGM schedule, in accordance with one embodiment. At step 702, pass-off testing data indicative of an actual value of at least one operating parameter of the engine is obtained. As previously described, the pass-off testing data may be obtained from a test cell system and/or retrieved from suitable storage (e.g., a memory or database). The next step 704 is to determine, based on the pass-off testing data obtained at step 702, at least one trim value to be used to adjust the VGM setting to bring the actual value of the at least one operating parameter towards a target value for achieving a substantially constant running line for the engine. The setting of that at least one VGM is then adjusted using the at least one trim value (step 706). As previously noted, step 706 is performed during pass-off testing.

Figure 7B:
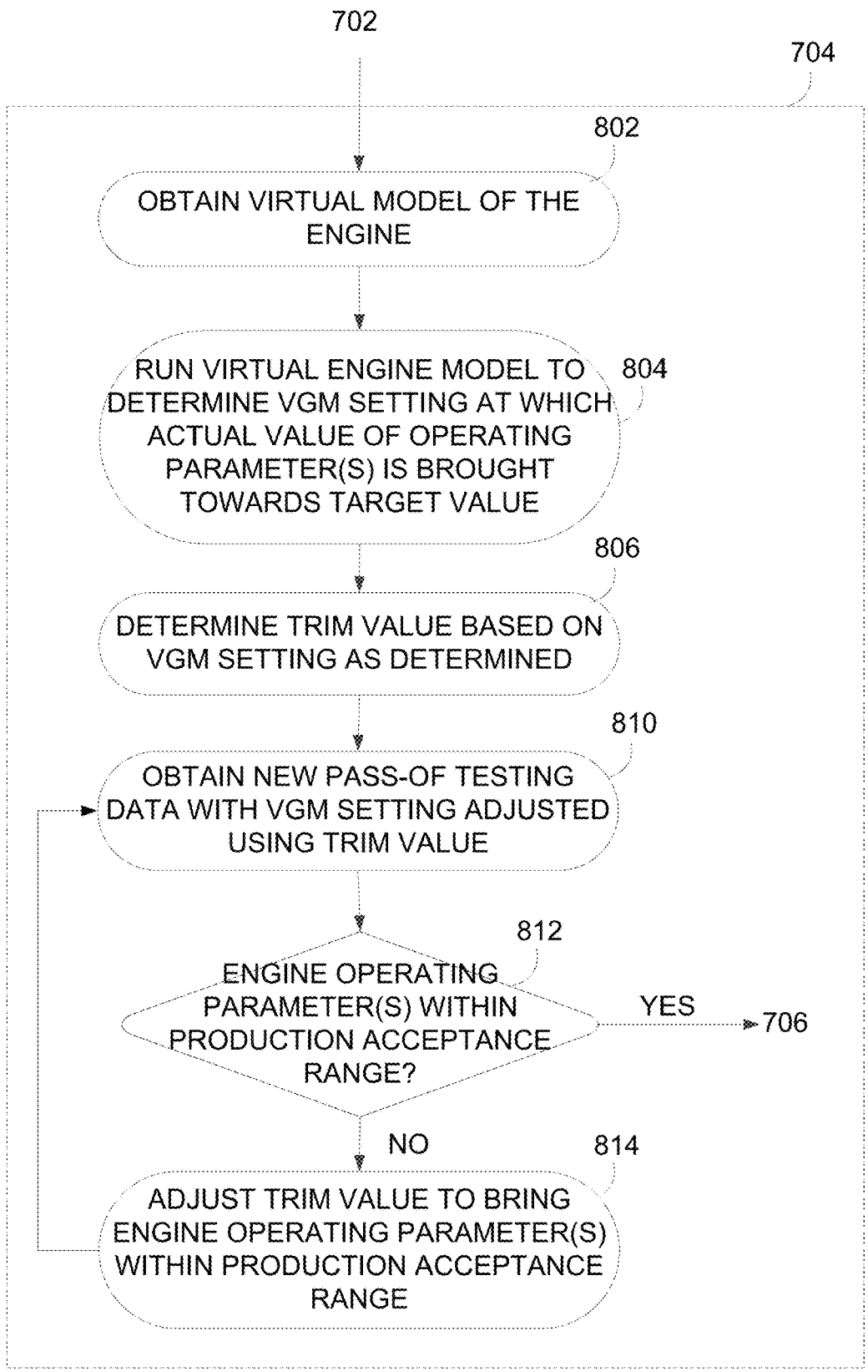
FIG. 7B is a flow diagram of the step of FIG. 7A of determining at least one trim value, in accordance with an illustrative embodiment.

Referring now to FIG. 7B, the step 704 of determining the at least one trim value illustratively comprises obtaining (e.g., from any suitable storage means such as a database or memory) a virtual model of the engine at step 802. As described herein above, the virtual engine model is able to simulate the engine's behaviour based on the engine's design, operating conditions, and limitations. The next step 804 is to run the engine model to determine a VGM setting at which the actual value of the engine's operating parameter(s) is brought towards the target value. In one embodiment, step 804 may first involve aligning the engine model to match the pass-off testing data obtained at step 702. Step 804 may further involve running the aligned model at a target value for a first engine operating parameter (e.g., a target compressor mass flow) and adjusting the VGM setting to reach a target value for a second engine operating parameter (e.g., target pressure ratio or surge margin). Step 804 may further involve recording (e.g., storing in memory) the VGM setting (referred to herein as a "first VGM setting") that allows to reach the target value for a second engine operating parameter at a given value of the first engine operating parameter. The resulting shaft horse power SHP (or corrected compressor rotor speed Ncorr, depending on the engine operating parameter being targeted) may also be recorded. Step 804 may further involve running the aligned model at the recorded shaft horse power (or corrected compressor rotor speed), using the nominal VGM schedule and recording the resulting VGM setting (referred to herein as a "second VGM setting"). The next step 806 is then to determine the trim value based on the VGM setting as determined. In one embodiment, step 806 involves computing the at least one trim value by subtracting the first VGM setting from the second VGM setting.

At step 810, new pass-off testing data is obtained with the VGM setting being adjusted using the trim value determined at step 806. At step 812, it is assessed whether the engine operating parameter(s) are within a production acceptance range. As described herein above, the production acceptance range defines minimum and maximum values (or limits) for the engine operating parameters that cannot be exceeded. The assessment is performed at step 812 by comparing the new pass-off testing data (i.e. the actual values of the engine operating parameters) to the production acceptance range. When it is determined that the engine operating parameter(s) fail to be within a production acceptance range, the trim value determined at step 806 is adjusted to bring the engine operating parameter(s) within the production acceptance range (814). Otherwise, the trim value determined at step 806 is retained (i.e. left unadjusted) and method 700 proceeds to step 706 for adjusting the VGM setting using the trim value.

The methods and systems described herein may be implemented in a high level procedural or object oriented programming or scripting language, or a combination thereof, to communicate with or assist in the operation of a computer system, for example the computing device 600. Alternatively, the methods and systems may be implemented in assembly or machine language. The language may be a compiled or interpreted language. Program code for implementing the methods and systems may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems may also be considered to be implemented by way of a non-transitory computer-readable storage medium having a computer program stored thereon. The computer program may comprise computer-readable instructions which cause a computer, or more specifically the processing unit 602 of the computing device 600, to operate in a specific and pre-defined manner to perform the functions described herein, for example those described in the method 700.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, trim values may be applied to VGM in order to optimize one or more parameters of the engine concurrently. The engine may be a turbofan or turboprop instead of a turboshaft. The engine may have a single spool instead of multiple spools. The engine may have a single compression stage or multiple compression stages. Yet further modifications could be implemented by a person of ordinary skill in the art in view of the present disclosure, which modifications would be within the scope of the present technology.

The invention claimed is:

1. A method for configuring at least one variable geometry mechanism (VGM) of an aircraft engine, the method comprising:

obtaining pass-off testing data for the aircraft engine, the pass-off testing data indicative of an actual value of at least one operating parameter of the aircraft engine;

determining, based on the pass-off testing data, at least one trim value to be used to adjust a setting of the at least one VGM to bring the actual value of the at least one operating parameter towards a target value, a running line of the aircraft engine being substantially constant when the actual value of the at least one operating parameter is at the target value, the running line defined as a function of a first parameter and second parameter of the aircraft engine, the determining comprising obtaining a virtual engine model for simulating a behaviour of the aircraft engine;

running the virtual engine model to determine a position of the at least one VGM at which the actual value of the at least one operating parameter is brought towards the target value, the running of the virtual engine model comprising aligning the virtual engine model with the pass-off testing data to obtain an aligned model;

running the aligned model to stimulate the behaviour of the aircraft engine at a target value of the first parameter;

determining a first position of the at least one VGM at which a target value of the second parameter is achieved;

determining a current value of a third parameter of the aircraft engine with the at least one VGM in the first position;

running the aligned model to simulate the behaviour of the aircraft engine at the current value of the third parameter to determine a second position of the at least one VGM; and determining the at least one trim value by subtracting the first position from the second position; and adjusting, during pass-off testing of the aircraft engine, the setting of the at least one VGM using the at least one trim value.

2. The method of claim 1, further comprising:
obtaining new pass-off testing data for the aircraft engine with the setting of the at least one VGM adjusted using the at least one trim value, the new pass-off testing data indicative of a new value of the at least one operating parameter;
assessing, based on the new pass-off testing data, whether the new value of the at least one operating parameter is within a production acceptance range;
adjusting the at least one trim value when the new value of the at least one operating parameter fails to be within the production acceptance range; and
retaining the at least one trim value when the new value of the at least one operating parameter is within the production acceptance range.

3. The method of claim 1, wherein the adjusting the setting of the at least one VGM using the at least one trim value comprises applying the at least one trim value to at least one nominal schedule of the at least one VGM to determine at least one trimmed schedule for the at least one VGM, the setting of the at least one VGM adjusted in accordance with the at least one trimmed schedule.

4. The method of claim 3, wherein the at least one nominal schedule represents the setting of the at least one VGM as a function of the at least one operating parameter, and further wherein the at least one trim value is applied to the at least one nominal schedule as a constant value for all values of the at least one operating parameter.

5. The method of claim 3, wherein the at least one nominal schedule represents the setting of the at least one VGM as a function of the at least one operating parameter and of at least one additional parameter, and further wherein the applying the at least trim value to the at least one nominal schedule comprises determining at least one scaling factor to be applied to the at least one trim value to obtain at least one scaled trim value that accounts for the at least one additional parameter and applying the at least one scaled trim value to the at least one nominal schedule.

6. The method of claim 5, wherein the at least one operating parameter comprises at least one of a specific fuel consumption, a turbine inlet temperature, a surge margin, a pressure ratio, and an acceleration time of the aircraft engine, and further wherein the at least one additional parameter comprises at least one of an altitude, an ambient pressure, an ambient temperature, a rotational speed of the aircraft engine, a power of the aircraft engine, and an air pressure measured at an exit of at least one compression stage of the aircraft engine.

7. The method of claim 1, wherein the first parameter is compressor mass flow, the second parameter is one of pressure ratio and surge margin, and the third parameter is one of shaft horse power and corrected compressor rotor speed.

8. The method of claim 1, wherein the at least one trim value is determined for the running line of one or more compression stages of the aircraft engine to be substantially constant, the at least one VGM associated with the one or more compression stages.

* * * * *